United States Patent
Funakoshi et al.

(10) Patent No.: US 9,207,510 B2
(45) Date of Patent: *Dec. 8, 2015

(54) LIQUID CRYSTAL DISPLAY DEVICE

(71) Applicant: Japan Display Inc., Minato-ku (JP)

(72) Inventors: Hirofumi Funakoshi, Saitama (JP); Jin Hirosawa, Saitama (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,998

(22) Filed: Oct. 13, 2014

(65) Prior Publication Data

US 2015/0029427 A1    Jan. 29, 2015

Related U.S. Application Data

(62) Division of application No. 13/449,621, filed on Apr. 18, 2012, now Pat. No. 8,896,795.

(30) Foreign Application Priority Data

Apr. 19, 2011    (JP) .................................. 2011-093424

(51) Int. Cl.
G02F 1/1362    (2006.01)
G02F 1/1343    (2006.01)
G02F 1/1333    (2006.01)
(Continued)

(52) U.S. Cl.
CPC ........ *G02F 1/136286* (2013.01); *G02F 1/1337* (2013.01); *G02F 1/1368* (2013.01); *G02F 1/133345* (2013.01); *G02F 1/134363* (2013.01); *G02F 1/136213* (2013.01); *G02F 1/136227* (2013.01); *G02F 1/136277* (2013.01); *G02F 2001/134381* (2013.01)

(58) Field of Classification Search
None
See application file for complete search history.

(56) References Cited

U.S. PATENT DOCUMENTS

| 6,266,116 B1 | 7/2001 | Ohta et al. |
| 2001/0010575 A1 | 8/2001 | Yoshida et al. |

(Continued)

FOREIGN PATENT DOCUMENTS

| JP | 6-222397 | 8/1994 |
| JP | 7-159807 | 6/1995 |

(Continued)

OTHER PUBLICATIONS

Office Action issued May 14, 2013 in Japanese Patent Application No. 2011-093424 submitting English translation only.

*Primary Examiner* — Richard Kim
(74) *Attorney, Agent, or Firm* — Oblon, McClelland, Maier & Neustadt, L.L.P.

(57) ABSTRACT

In one embodiment, a liquid crystal display device includes a first substrate and a second substrate. The first substrate includes a first gate line and a second gate line respectively extending in a first direction. A main pixel electrode is arranged between the first gate line and the second gate line and extending in a second direction orthogonally crossing the first direction. A pair of sub-common electrodes respectively faces the first gate line and the second gate line through an insulating layer and extends in the first direction. The second substrate includes a main common electrode electrically connected with the sub-common electrode and arranged on both sides sandwiching the main pixel electrode. A liquid crystal layer is held between the first substrate and the second substrate.

13 Claims, 10 Drawing Sheets

(51) Int. Cl.
*G02F 1/1337* (2006.01)
*G02F 1/1368* (2006.01)

(56) References Cited

U.S. PATENT DOCUMENTS

| | | | |
|---|---|---|---|
| 2003/0133066 A1* | 7/2003 | Ono et al. | 349/141 |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186268 A1* | 8/2008 | Takeuchi et al. | 345/87 |
| 2008/0186439 A1 | 8/2008 | Kwon et al. | |
| 2010/0245697 A1* | 9/2010 | Shiiba et al. | 349/39 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2009-109657 A | 5/2009 |

* cited by examiner

LIQUID CRYSTAL DISPLAY DEVICE

CROSS-REFERENCE TO RELATED APPLICATION

This application is a divisional of U.S. application Ser. No. 13/449,621 filed Apr. 18, 2012, and is based upon and claims the benefit of priority from prior Japanese Patent Application No. 2011-093424, filed Apr. 19, 2011, the entire contents of each of which are incorporated herein by reference.

FIELD

Embodiments described herein relate generally to a liquid crystal display device.

BACKGROUND

In recent years, a flat panel display is developed briskly, and especially the liquid crystal display device gets a lot of attention from advantages, such as light weight, thin shape, and low power consumption. Especially, in an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a part of the specification, illustrate embodiments of the invention, and together with the general description given on and the detailed description of the embodiments given below, serve to explain the principles of the invention.

FIG. 7 is a view schematically showing a cross-sectional structure of the liquid crystal panel taken along line A-A in FIG. 6 and an alignment state of liquid crystal molecules at the time of ON.

FIG. 8 is a view schematically showing a cross-sectional structure of the liquid crystal panel taken along line B-B in FIG. 6 and an alignment state of liquid crystal molecules at the time of ON.

DETAILED DESCRIPTION

Figure 1:
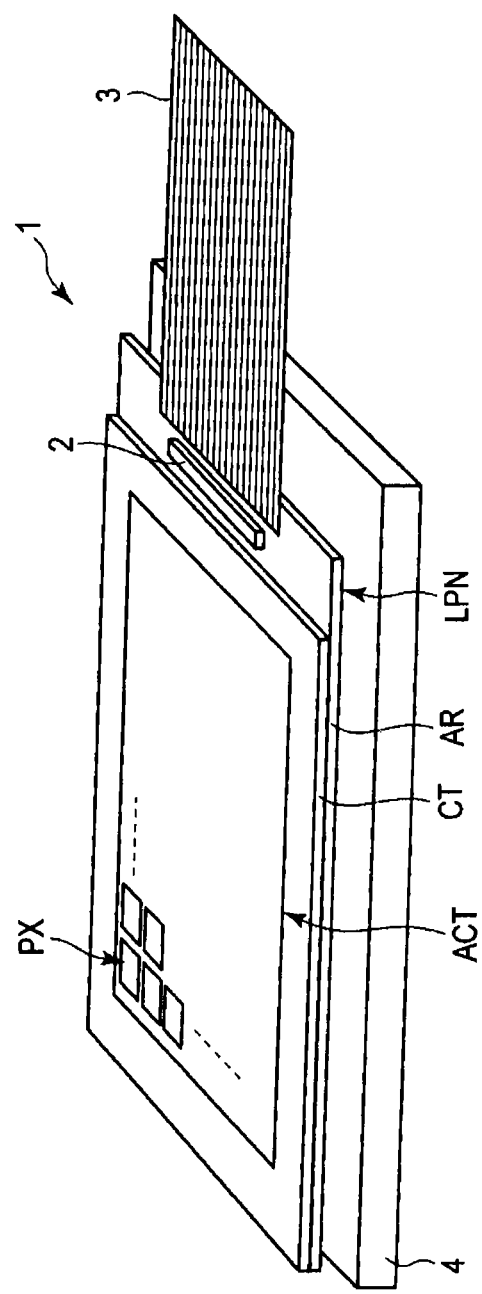
FIG. 1 is a figure schematically showing a structure of a liquid crystal display device according to one embodiment.

A liquid crystal display device according to an exemplary embodiment of the present invention will now be described with reference to the accompanying drawings wherein the same or like reference numerals designate the same or corresponding parts throughout the several views.

According to one embodiment, a liquid crystal display device includes: a first substrate including; a first gate line and a second gate line respectively extending in a first direction, a main pixel electrode arranged between the first gate line and the second gate line and extending in a second direction orthogonally crossing the first direction, and a pair of sub-common electrodes respectively facing the first gate line and the second gate line through an insulating layer and extending in the first direction, a second substrate including a main common electrode electrically connected with the sub-common electrode and arranged on both sides sandwiching the main pixel electrode; and a liquid crystal layer containing liquid crystal molecules and held between the first substrate and the second substrate.

According to other embodiment, a liquid crystal display device having a plurality of pixels includes: a first substrate including; a first gate line and a second gate line respectively extending in a first direction, an auxiliary capacitance line arranged between the first gate line and the second gate line and extending in the first direction, a first insulating layer covering the first gate line, the second gate line, and the auxiliary capacitance line, a first source line and a second source line extending in a second direction orthogonally crossing the first direction on the first insulating layer, a second insulating layer covering the first and second source lines, a main pixel electrode arranged on the second insulating layer and extending in the second direction, the main pixel electrode being arranged between the first gate line and the second gate line, and between the first source line and the second source line, a pair of sub-common electrodes respectively facing the first gate line and the second gate line through the second insulating layer and extending in the first direction, and a first main common electrode facing the first and second source lines through the second insulating layer and extending in the second direction, the first main common electrode being cut on the auxiliary capacitance line and electrically connected with the sub-common electrodes, a second substrate including a pair of second main common electrodes electrically connected with the sub-common electrodes and the first main common electrode, and arranged both sides sandwiching the main pixel electrode, the second main common electrodes extending in the second direction; and a liquid crystal layer containing liquid crystal molecules and held between the first substrate and the second substrate.

According to other embodiment, a liquid crystal display device having a plurality of pixels includes: a first substrate including; a first auxiliary capacitance line and a second auxiliary capacitance line respectively extending in a first direction, a gate line arranged between the first auxiliary capacitance line and the second auxiliary capacitance line respectively extending in the first direction, a main pixel electrode extending in a second direction orthogonally crossing the first substrate, a sub-pixel electrode facing the gate line through an insulating layer and extending in the first direction, the sub-pixel electrode being electrically connected with the main pixel electrode, a second substrate including a pair of main common electrodes arranged on both sides sandwiching the main pixel electrode and extending in the second direction; and a liquid crystal layer containing liquid crystal molecules and held between the first substrate and the second substrate.

FIG. 1 is a figure schematically showing the structure of the liquid crystal display device 1 according to a first embodiment.

The liquid crystal display device 1 includes an active-matrix type liquid crystal display panel LPN, a driver IC chip 2 connected to the liquid crystal display panel LPN, a flexible wiring substrate 3, a backlight 4 for illuminating the liquid crystal display panel LPN, etc.

The liquid crystal display panel LPN is equipped with an array substrate AR as a first substrate, a counter substrate CT as a second substrate arranged opposing the array substrate AR, and a liquid crystal layer (not shown) held between the array substrate AR and the counter substrates CT. The liquid crystal display panel LPN includes an active area ACT which displays images. The active area ACT is constituted by a plurality of pixels PX arranged in the shape of a (m×n) matrix (here, "m" and "n" are positive integers).

A backlight 4 is arranged on the back side of an array substrate AR in the illustrated example. Various types of backlights can be used as the backlight 4. For example, a light emitting diode (LED) or a cold cathode fluorescent lamp (CCFL), etc., can be applied as a light source of the backlight 4, and the explanation about its detailed structure is omitted.

Figure 2:
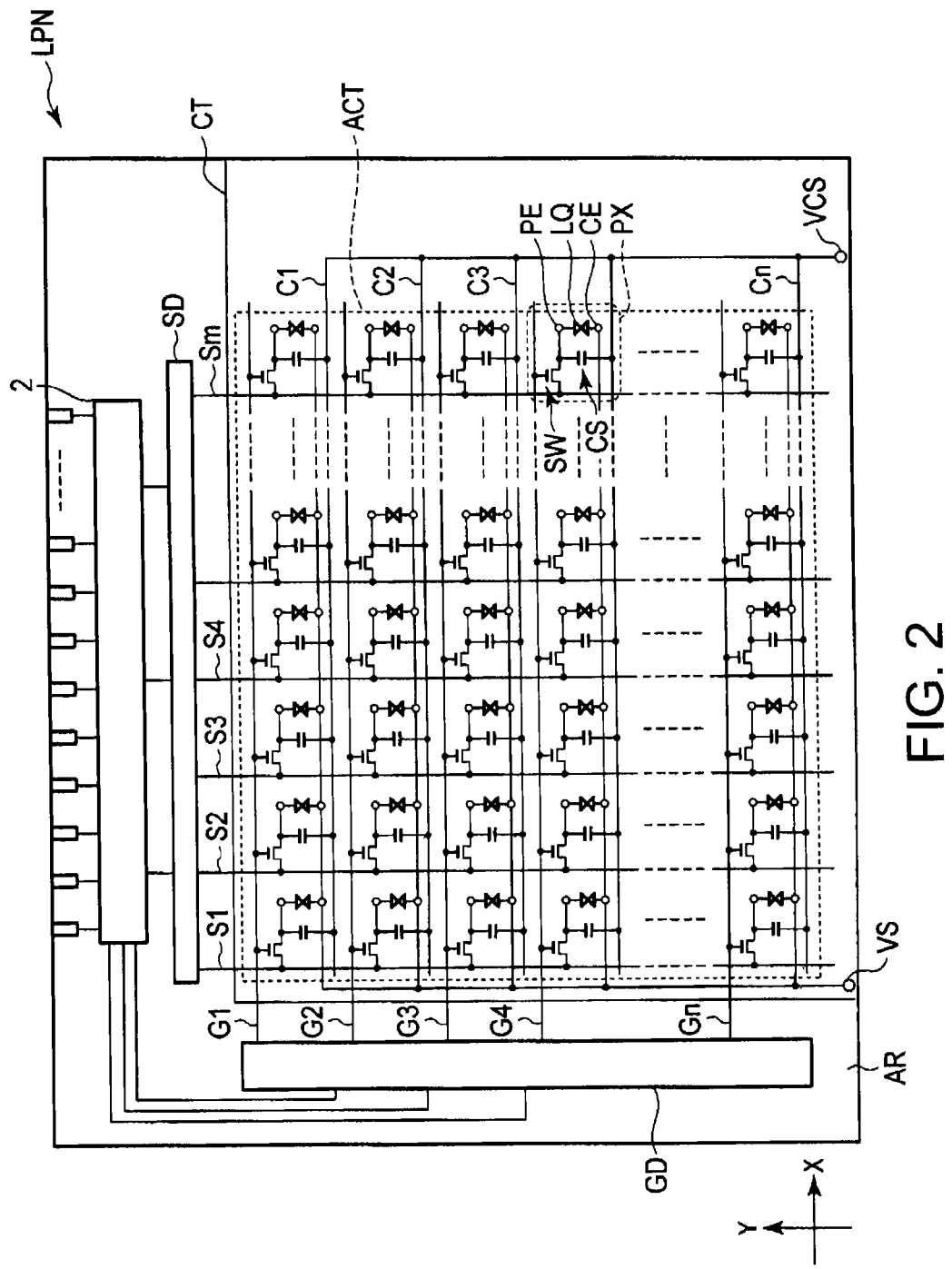
FIG. 2 is a figure schematically showing the structure and the equivalent circuit of a liquid crystal display panel shown in FIG. 1.

FIG. 2 is a figure schematically showing the structure and an equivalent circuit of the liquid crystal display panel LPN shown in FIG. 1.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C respectively extend in a first direction X by turns. Moreover, the gate line G and the auxiliary capacitance line C are arranged in parallel each other in a second direction Y that intersects perpendicularly the first direction X. However, they do not necessarily extend linearly. The source lines S extend in the second direction Y that intersects the gate line G and the auxiliary capacitance line C in parallel. Though the source lines S extend in the second direction Y, respectively, they do not necessarily extend linearly. A portion of the respective gate line G, auxiliary capacitance line C and source lines S may be crooked partially.

Each gate line G is pulled out to the outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE.

In addition, in the liquid crystal display panel LPN according to this embodiment, while the pixel electrode PE is formed in the array substrate AR, the common electrode CE is formed in the array substrate AR and the counter substrate CT. Liquid crystal molecules of a liquid crystal layer LQ are switched mainly using an electric field formed between the pixel electrodes PE and the common electrodes CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrates.

The switching element SW is constituted by n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The common electrode CE is set to a common potential, for example. The common electrode CE is arranged in common to the plurality of pixel electrodes PE through the liquid crystal layer LQ. The auxiliary capacitance line C is electrically connected with a voltage impressing portion VCS to which the auxiliary capacitance voltage is impressed.

The array substrate AR includes an electric power supply portion VS formed outside of the active area ACT. A portion of the common electrode CE formed on the array substrate AR is connected with the electric power supply portion VS at the outside of the active area ACT. Furthermore, a portion of the common electrode CE formed on the counter substrate CT is electrically connected with the electric power supply portion VS formed in the array substrate AR through an electric conductive component which is not illustrated.

Figure 3:
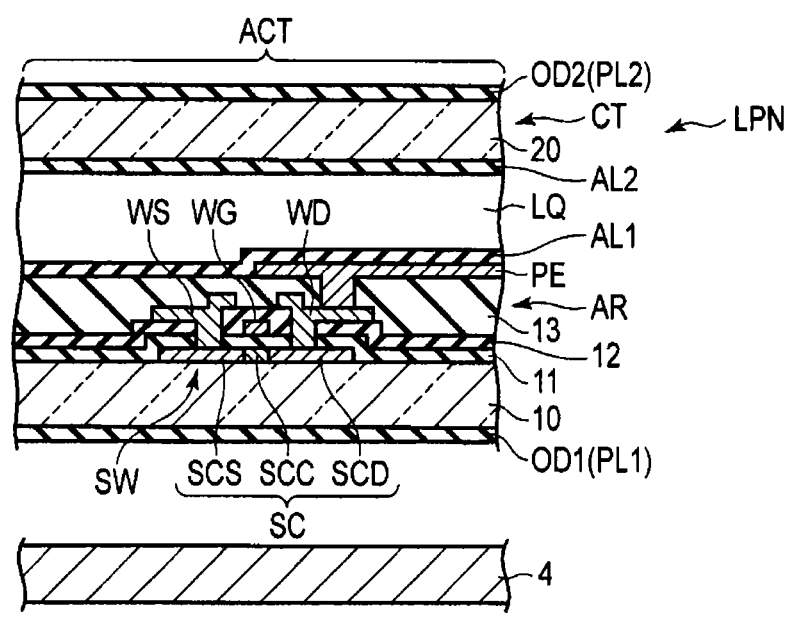
FIG. 3 is a cross-sectional view schematically showing the liquid crystal display panel including a switching element, etc.

FIG. 3 is a cross-sectional view schematically showing the liquid crystal display panel LPN containing the switching element SW. Here, illustration of a common electrode is omitted and only the part required for explanation is illustrated.

The backlight 4 is arranged at the back side of the array substrate AR which constitutes the liquid crystal display panel LPN.

The array substrate AR is formed using an insulating substrate 10 having a light transmissive characteristic, such as a glass substrate and a plastic substrate. This array substrate AR includes the switching element SW, the pixel electrode PE, a first alignment film AL1, etc., on the side facing the counter substrate CT of the first insulating substrate 10.

In the example shown here, the switching element SW may be either a top-gate-type switching element or a bottom-gate-type switching element, and includes a semiconductor layer formed of poly-silicon or amorphous silicon, though the detailed description thereof is not made.

The semiconductor layer SC has a source region SCS and a drain region SCD on both sides which face across a channel region SCC, respectively. In addition, an undercoat layer which is an insulating film may be arranged between the first insulating substrate 10 and the semiconductor layer SC. The semiconductor layer SC is covered with a gate insulating film 11. Moreover, the gate insulating film 11 is arranged also on the first insulating substrate 10.

The gate electrode WG is formed on the gate insulating film 11, and is located on the channel region SCC of the semiconductor layer SC. The gate line G and the auxiliary capacitance line C are also formed on the gate insulating film 11. The gate electrode WG, the gate line G and the auxiliary capacitance line C may be formed using the same material and the same process. The gate electrode WG is electrically connected with the gate line G.

The gate electrode WG of the switching element SW, the gate line G and the auxiliary capacitance line C are covered with a first interlayer insulating film 12. Moreover, the first interlayer insulating film 12 is arranged also on the gate insulating film 11. The gate insulating layer 11 and the first interlayer insulating film 12 are formed of an inorganic system material, such as silicon oxide and a silicon nitride.

A source electrode WS and a drain electrode WD of the switching element SW are formed on the first interlayer insulating film 12. The source line (not shown) is also formed on the first interlayer insulating film 12. The source electrode WS, the drain electrode WD, and the source lines may be formed using the same process and the same material. The source electrode WS is electrically connected with the source line.

The source electrode WS is in contact with the source region SCS of the semiconductor layer SC through a contact hole which penetrates the gate insulating film 11 and the first interlayer insulating film 12. The drain electrode WD is in contact with the drain region SCD of the semiconductor layer SC through a contact hole which penetrates the gate insulating film 11 and the first interlayer insulating film 12. The gate electrode WG, the source electrode WS, and the drain electrode WD are formed of electric conductive materials, such as molybdenum, aluminum, tungsten, and titanium, for example.

The switching element SW as described-above is covered with a second interlayer insulating film 13. That is, the source electrode WS, the drain electrode WD, and the source lines are covered with the second interlayer insulating film 13. Moreover, the second interlayer insulating film 13 is arranged also on the first interlayer insulating film 12. This second interlayer insulating film 13 is formed of various organic materials, such as ultraviolet curing type resin and heat curing type resin, for example.

The pixel electrode PE is formed on the second interlayer insulating film 13. The pixel electrode PE is connected with the drain electrode WD through a contact hole which penetrates the second interlayer insulating film 13. Though pixel electrode PE is formed by light transmissive conductive materials, such as Indium Tin Oxide (ITO), Indium Zinc Oxide (IZO), etc, other metals such as aluminum may be used.

In addition, the array substrate AR is further equipped with a sub-common electrode as a portion of the common electrode to be mentioned later. Furthermore, a main common electrode may be equipped.

The first alignment film AL1 is arranged on a surface of the array substrate AR facing the counter substrate CT, and extends approximately whole region of the active area ACT. The first alignment film AL1 covers the pixel electrode PE, and is also formed on the second interlayer insulating film 13. The first alignment film AL1 is formed of the material which shows a lateral alignment characteristics.

On the other hand, the counter substrate CT is formed using a second transmissive insulating substrate 20, such as a glass substrate and a plastic substrate. The counter substrate CT includes a second main common electrode of the common electrodes and the second alignment film AL2 on the surface of the second insulating substrate 20 facing the array substrate AR. A black matrix arranged facing wiring portions such as the source line S, the gate line G, the auxiliary capacitance line C, and the switching element SW to define the respective pixels PX, color filter layers arranged corresponding to the pixels PX, and an overcoat layer to smooth the concave and depression of the surface of the black matrix and the color filter layer may be formed on the counter substrate CT.

The common electrode is formed of the electric conductive material which has light transmissive characteristics, such as ITO and IZO, for example.

The second alignment films AL2 is arranged on a surface of the counter substrate CT opposing the surface of the array substrate AR, and extends approximately whole of the active area ACT. The second alignment films AL2 covers the second main common electrode of the common electrodes (not shown) and the like. The second alignment films AL2 is formed materials which have a lateral alignment characteristics An alignment processing (for example, rubbing processing and photo alignment processing) is performed for making the first and second alignment films AL1 and AL2 in an initial alignment state. The direction of the first alignment processing where the first alignment AL1 carries out the initial alignment of the liquid crystal molecule, and the direction of the second alignment processing where the second alignment AL2 carries out the initial alignment of the liquid crystal molecule, are respectively directions in parallel to the second direction Y. The first and second alignment directions are in parallel and in the same directions or reverse directions each other.

The array substrate AR and the counter substrate CT as mentioned-above are arranged so that the first alignment film AL1 and the second alignment film AL2 face each other. In this case, the pillar-shaped spacer is formed integrally with one of the substrates by resin material between the first alignment film AL1 on the array substrate AR and the second alignment film AL2 on the counter substrate CT. Thereby, a predetermined gap, for example, a 3-7 μm cell gap, is formed, for example. The array substrate AR and the counter substrate CT are pasted together by the seal material which is not illustrated, in which the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted by positive type liquid crystal material.

A first optical element OD1 is attached to the external surface of the array substrate AR, i.e., the external surface of the first insulating substrate 10 which constitutes the array substrate AR by adhesives, etc. The first optical element OD1 contains first polarizing plate PL1 which has a first polarization axis. Moreover, a second optical element OD2 is attached to the external surface of the counter substrate CT, i.e., the external surface of the second insulating substrate 20 which constitutes the counter substrate CT by adhesives, etc. The second optical element OD2 contains a second polarizing plate PL2 which has a second polarization axis. The first polarization axis of the first polarizing plate PL1 and the second polarization axis of the second polarizing plate PL2 has a relationship in which both axis intersect perpendicularly, for example. One polarizing plate is arranged, for example, so that its polarizing direction is the direction of the long axis of the liquid crystal molecule, i.e., the first alignment processing direction or a parallel direction to the second alignment processing direction (or in parallel to the second direction Y), or in orthogonal direction (or in parallel to the first direction X). Thereby, the normally black mode is achieved.

Hereinafter, one example of the structure of the embodiment is explained more practically.

First Embodiment

Figure 4:
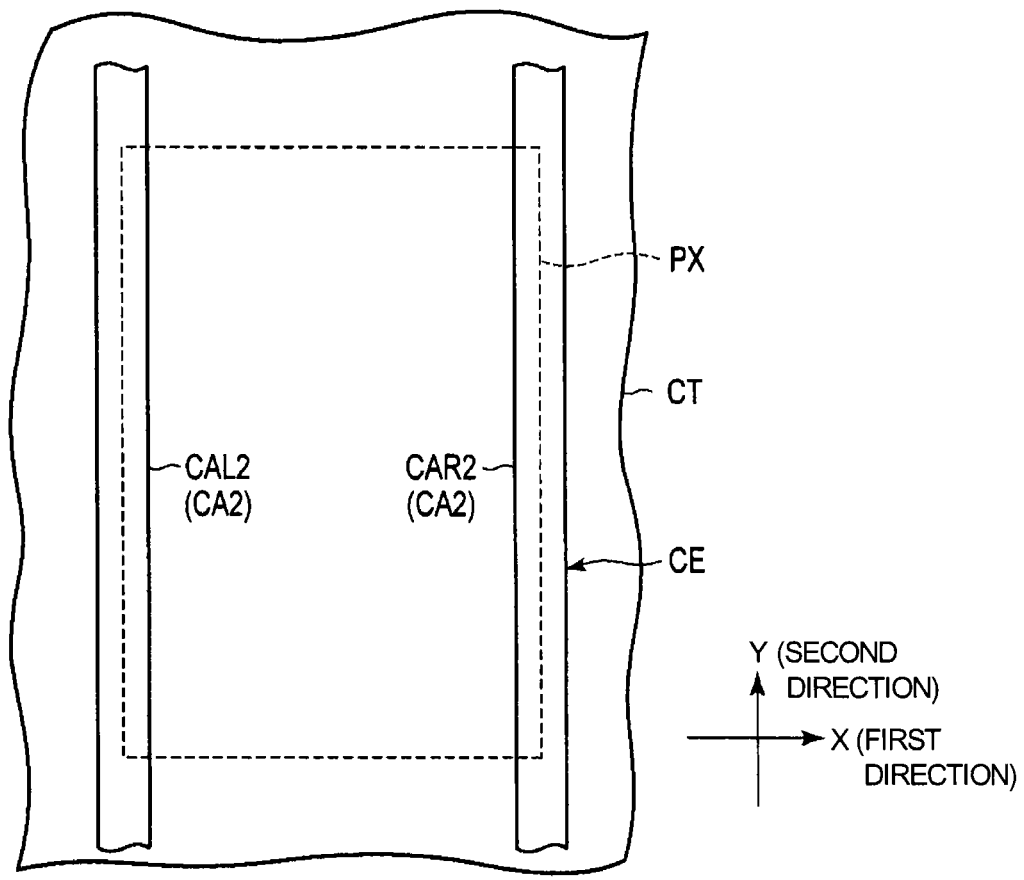
FIG. 4 is a plan view schematically showing a structure of one pixel in a counter substrate according to a first embodiment.

FIG. 4 is a plan view schematically showing the structure of one pixel in the counter substrate constituting the liquid crystal display panel LPN according to a first embodiment.

The common electrode CE has a sub-common electrode extending along the first direction X and a main common electrode extending along the second direction Y. In this embodiment, the counter substrate CT is equipped with a second main common electrode CA2 as the common electrode CE, and a sub-common electrode CB1 on the array substrate to be mentioned later as the sub-common electrode.

That is, the illustrated counter substrate CT is equipped with the belt-like second main common electrode CA2 extending linearly along the second direction Y. In the illustrated example, the common electrode CE is formed in the counter substrate CT in the shape of a stripe extending in the second direction Y. Moreover, the illustrated second main common electrode CA2 is located in two lines 2 in parallel along the first direction X. Hereinafter, in order to distinguish the second main common electrodes CA2, the second main common electrode CA2 of the left-hand side in the figure is called CAL2, and the second main common electrode CAL2 of the right-hand side in the figure is called CAR2. In addition, the counter substrate CT may be equipped with a sub-common electrode.

The second main common electrodes CA2 of the common electrode CE in the active area are pulled out to the outside of the active area, and is electrically connected with the electric supply portion formed on the array substrate AR through a conductive element, respectively. Thereby, electric power of common potential is supplied to the second main common electrode CA2.

Figure 5:
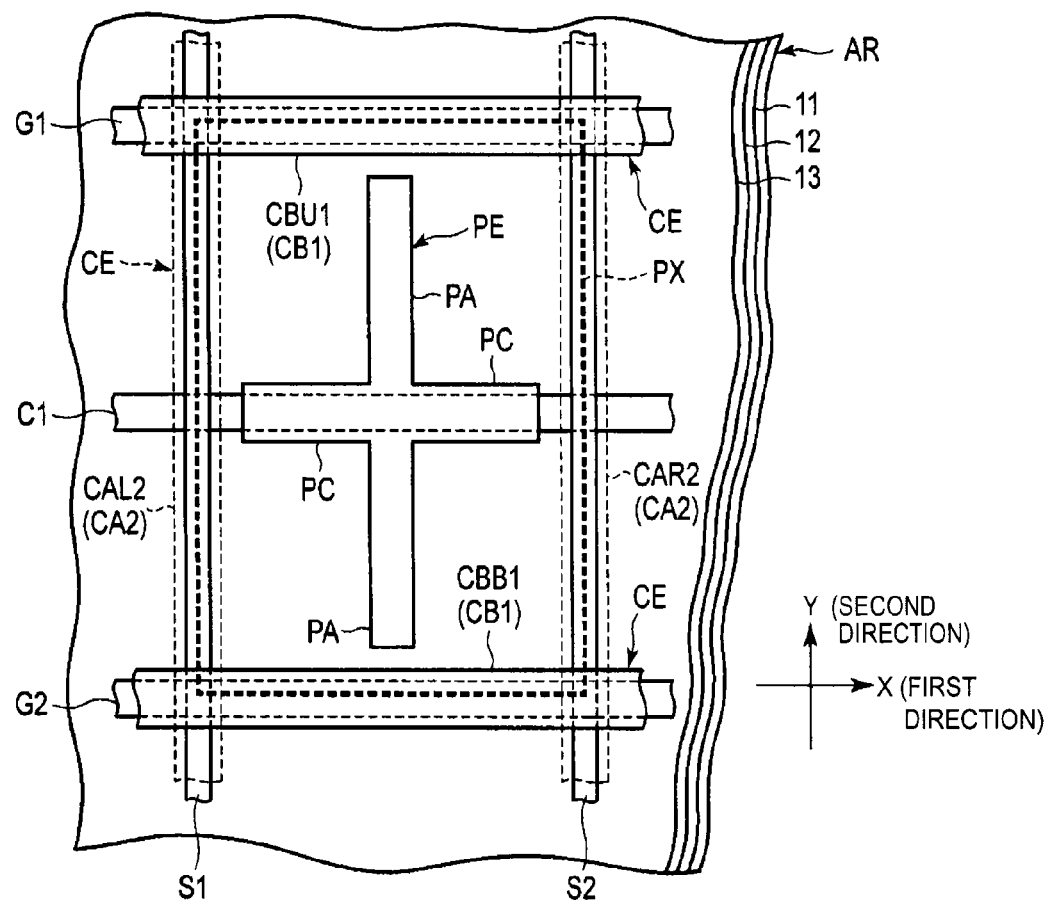
FIG. 5 is a plan view schematically showing the structure of an array substrate of a pixel in the liquid crystal display panel when the pixel is seen from the counter substrate side according to the first embodiment.

FIG. 5 is a plan view schematically showing the structure of the array substrate AR when one pixel PX of the liquid crystal panel LPN according to the first embodiment is seen from the counter substrate CT side. In addition, only structure required for the explanation in one PX is illustrated, and illustration of the switching element, etc., is omitted.

The array substrate AR includes gate lines G1 and G2 extending along the first direction X, an auxiliary capacitance line C1 extending along the first direction X, a source line S1 and a source line S2 extending along the second direction Y, a pixel electrode PE, and a belt-like sub-common electrode CB1 extending linearly along the first direction X as a portion of the common electrodes CE. The auxiliary capacitance line C1, the gate line G1, and the gate line G2 are formed on the gate insulating film 11, and are covered with the first interlayer insulating film 12. The source line S1 and the source line S2 are formed on the first interlayer insulating film 12, and are covered with the second interlayer insulating film 13. The pixel electrode PE is formed on the second interlayer insulating film 13. The sub-common electrode CB1 is formed on the second interlayer insulating film 13, for example, like the pixel electrode PE.

In the illustrated example, the pixel PX corresponds to a region shown in a dashed line in the figure, and has the shape of a rectangle in which the length in the second direction Y is longer than that in the first direction X. Moreover, in the illustrated example, the source line S1 is arranged at the left-hand side end in the pixel PX. Precisely, the source line S1 is arranged striding over a boundary between the illustrated pixel and the pixel which adjoins the illustrated pixel PX at its left-hand side end. The source line S2 is arranged at the right-hand side end. Precisely, the source line S2 is also arranged striding over a boundary between the illustrated pixel and the pixel which adjoins the illustrated pixel PX at its right-hand side end. The auxiliary capacitance line C1 is arranged approximately in the central portion of the pixel PX. In addition, the gate line G1 is arranged striding over a boundary between the illustrated pixel PX and an adjacent pixel PX on the upper side. Similarly, the gate line G2 is arranged striding over a boundary between the illustrated pixel PX and an adjacent pixel on the bottom side.

In the common electrode CE, when the sub-common electrode CB1 is formed on the second interlayer insulating film 13 with the pixel electrode PE, the sub-common electrode CB1 can be formed using the same process and the same materials (for example, ITO, etc.) as the pixel electrode PE. In this case, the sub-common electrode CB1 is electrically insulated from the pixel electrode PE and is apart from the pixel electrode PE. The sub-common electrode CB1 and the pixel electrode PE may be formed in different layers each other by interposing other interlayer insulating layer between the sub-common electrode CB1 and the pixel electrode PE. In this case, the sub-common electrode CB1 may be formed of material which is different from the pixel electrode PE or same material as the pixel electrode PE.

The sub-common electrodes CB1 linearly extends in each active area and are pulled out to the outside of the active area, and further is electrically connected with the electric supply portion formed on the array substrate AR, respectively. Thereby, electric power of common potential is supplied to the sub-common electrode CB1. That is, the sub-common electrode CB1 and the second main common electrode CA2 are electrically connected each other.

In the illustrated example, a pair of sub-common electrodes CB1 is arranged in the first direction X in parallel each other. Hereinafter, in order to distinguish the sub-common electrodes CB1, the sub-common electrode CB1 on the upper side is called a sub-common electrode CBU1, and the sub-common electrode CB1 on the lower side is called a sub-common electrode CBB1. The sub-common electrodes CBU1 is arranged on the upper side facing the gate line G1. That is, the sub-common electrode CBU1 is arranged striding a boundary between the illustrated pixel and an adjoining pixel on the upper side. The sub-common electrodes CBB1 is arranged on the lower side facing the gate line G2. That is, the sub-common electrode CBB1 is arranged striding a boundary between the illustrated pixel and an adjoining pixel on the lower side. The first interlayer insulating film 12 and the second interlayer insulating film 13 are respectively interposed between the sub-common electrode CBU1 and the gate line G1, and between the sub-common electrode CBB1 and the gate line G2

In case the respective sub-common electrodes CBU1 and CBB1 cover the gate line G1 and the gate line G2 in the active area, that is, the sub-common electrode CBU1 is arranged on the gate line G1 and the sub-common electrode CBB1 is arranged on the gate line G2, the widths of the respective sub-common electrodes CBU1 and CBB1 along the second direction Y are substantially equal to or more than those of the gate line G1 and the gate line G2.

Moreover, in the illustrated example, as shown in a dashed line, the second main common electrode CAL2 formed in the counter substrate CT and constituting the common electrode CE is arranged at the left-hand side end of pixel PX, and faces the source line S1. That is, the second main common electrode CAL2 is arranged striding over a boundary between the illustrated pixel and an adjoining pixel on its left-hand side. Similarly, the second main common electrode CAR2 is arranged at the right-hand side end of the pixel PX, and faces the source line S2. That is, the second main common electrode CAR2 is arranged striding over a boundary between the illustrated pixel and an adjoining pixel on its right-hand side.

The pixel electrode PE is arranged between the source line S1 and the source line S2. In addition, the pixel electrode PE is arranged between the gate line G1 and the gate line G2 i.e., between the sub-common electrode CBU1 and the sub-common electrode CBB1. The pixel electrode PE is electrically connected with the switching element which is not illustrated. The pixel electrode PE has a belt-like main pixel electrode PA extending linearly along the second direction Y, and a belt-like capacitance portion PC extending linearly along the first direction X. The main pixel electrodes PA and the capacitance portion PC are electrically connected. In the illustrated example, the main pixel electrode PA and capacitance portion PC are integrally or continuously formed. That is, in the array substrate AR, the pixel electrode PE is formed in the shape of an approximately cross.

The main pixel electrode PA is arranged in an inside position of the pixel PX rather than the position right on the adjoining source line S1 and the source line S2, and is arranged between the source line S1 and the source line S2. More specifically, the main pixel electrode PA is arranged in the approximately center position between the source line S1 and the source line S2. The main pixel electrode PA extends from near the upper end to near a bottom end of the pixel PX.

In the illustrated example, the capacitance portion PC is arranged on the auxiliary capacitance line C1. Between the capacitance portion PC and the auxiliary capacitance line C1, a first interlayer insulating film 12 and a second interlayer insulating film 13 are interposed as insulating films. That is, the capacitance portion PC is arranged in an inside position of the pixel PX rather than the position right on the adjoining gate line G1 and the gate line G2, and is arranged between the gate line G1 and the gate line G2 or between the sub-common electrode CBU1 and the sub-common electrode CBB1. More practically, the capacitance portion PC is arranged approximately in the center of the pixel between the gate line G1 and the gate line G2. The capacitance portion PC intersects the main pixel electrode PA, and linearly extends from the main pixel electrode PA toward its both sides, i.e., toward the source line S1 on the left-hand side, and the source line S2 of the right-hand side of the main pixel electrode PA, respectively.

According to this embodiment, the second main common electrode CAL2 is arranged at the both sides which sandwich the main pixel electrode PA. In other word, the main pixel electrode PA and the second main common electrode CAL2 are arranged in the first direction X in turns. The main pixel electrode PA and the second main common electrode CA2 are arranged approximately in parallel each other. In this case, neither of the second main common electrodes CA2 overlaps with the main pixel electrode PA in a X-Y plane.

That is, one main pixel electrode PA is located between the adjoining second main common electrode CAL2 and the adjoining second main common electrode CAR2. The second main common electrode CAL2 and the second main common electrode CAR2 are arranged at the both sides which face across the position above the main pixel electrode PA. That is, the main pixel electrode PA is arranged between the second main common electrode CAL2 and the second main common electrode CAR2. Accordingly, the second main common electrode CAL2, the main pixel electrode PA, and the second main common electrode CAR2, are arranged along the first direction X in this order. The distance between the second main common electrode CAL2 and the main pixel electrode PA is approximately the same as that between the second main common electrode CAR2 and the main pixel electrode PA in the first direction X.

The sub-common electrode CB1 is arranged on the both sides which sandwich the capacitance portion PC. That is, the sub-common electrode CB1 and the capacitance portion PC are arranged by turns along the second direction Y. The sub-common electrode CB1 and the capacitance portion PC are arranged approximately in parallel each other. In this case, neither of the sub-common electrodes CB1 overlaps the capacitance portion C in the X-Y plane.

Namely, one capacitance portion PC is located between the sub-common electrodes CBU1 and the sub-common electrodes CBB1. The sub-common electrodes CBU1 and the sub-common electrode CBB1 are arranged on the both sides which sandwich the capacitance portion PC, i.e., the capacitance portion PC is arranged between the sub-common electrode CBU1 and the sub-common electrode CBB1. The sub-common electrode CBU1, the capacitance portion PC, and the sub-common electrode CBB1 are arranged along the second direction Y in this order.

Figure 6:
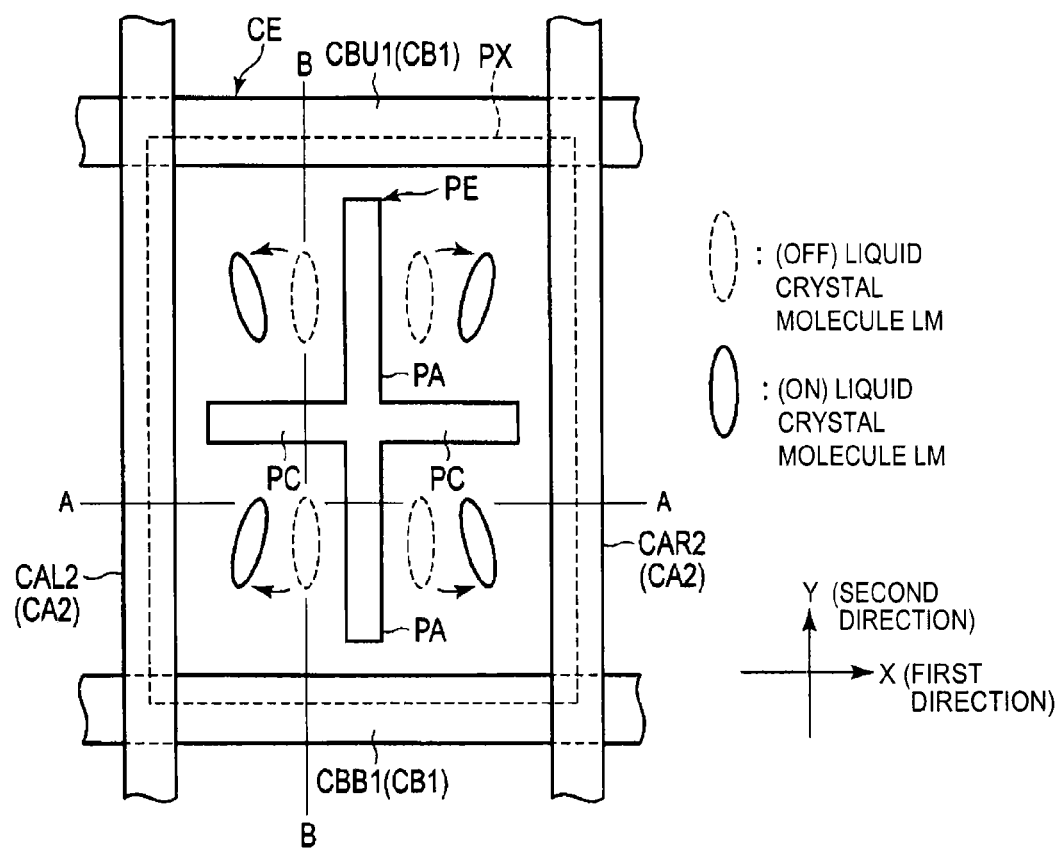
FIG. 6 is a plan view showing the operation of the pixel of the liquid crystal display panel.

FIG. 6 is a plan view showing one pixel showing an operation of the liquid crystal display panel.

At the time of non-electric field state, i.e., when a potential difference (i.e., electric field) is not formed between the pixel electrode PE and the counter electrode CE, the liquid crystal molecules of the liquid crystal layer LQ are aligned so that their long axis are aligned in a parallel direction with a first alignment processing direction of the first alignment film AL1 and a second alignment processing direction of the second alignment film AL2. In this state, at the time of OFF, the alignment state corresponds to the initial alignment state, and the alignment direction of the liquid crystal molecule corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM is carried out to the X-Y plane at the time of OFF. However, in order to explain simply hereinafter, the liquid crystal molecule LM is assumed that the liquid crystal molecule LM is aligned in parallel with the X-Y plane, and is explained as what rotates in a field in parallel to the X-Y plane.

Here, the first alignment processing direction of the first alignment film AL1 and the second alignment processing direction of the second alignment film AL2 are directions in parallel to the second direction Y, respectively. At the time of OFF, the long axis of the liquid crystal molecule LM is aligned substantially in parallel to the second direction Y as shown in a dashed line in the figure. That is, the direction of initial alignment of the liquid crystal molecule LM is in parallel to the second direction Y.

In addition, when both the first alignment processing direction of the first alignment film AL1 and the second alignment processing direction of the second alignment film AL2 are in parallel, and are reverse directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment) in a cross-section of the liquid crystal layer LQ. In addition, when the respective directions of the alignment processing for the first alignment film AL1 and the second alignment film AL2 are in parallel and the same directions each other, the liquid crystal molecule LM is aligned with approximately horizontal direction (i.e., the pre-tilt angle is approximately zero). The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment).

Some of the back light from the backlight 4 enters into the liquid crystal display panel LPN after penetrating the first polarizing plate PL1. The polarization state of the light which enters into the liquid crystal display panel LPN changes depending on the alignment state of the liquid crystal molecule LM when the light passes the liquid crystal layer LQ. At the time of OFF, the light which passes the liquid crystal layer LQ is absorbed by the second polarizing plate PL2 (black display).

On the other hand, in case where the potential difference is formed between the pixel electrode PE and the common electrode CE (at the time of ON), the lateral electric field in parallel to the substrate (or oblique electric field) is formed between the pixel electrode PE and the common electrode CE. Thereby, the liquid crystal molecule LM rotates in a parallel plane with the substrate surface so that the long axis becomes in parallel with the direction of the electric field as shown in a solid line in the figure.

In the example shown in the figure, the pixel is divided into four domains (apertures) by the main pixel electrode PA and the capacitance portion PC. That is, the liquid crystal molecule LM surrounded by the main pixel electrode PA, the sub-common electrode CBU1 and the second main common electrode CAL2 rotates counterclockwise with respect to the second direction Y along with the lateral electric field, and is substantially aligned so that the liquid crystal molecule LM may turn to the upper left direction in the figure. The liquid crystal molecule LM surrounded by the main pixel electrode PA, the sub-common electrode CBU1 and second main common electrode CAR2 rotates clockwise with respect to the second direction Y along with the lateral electric field, and is substantially aligned so that the liquid crystal molecule LM may turn to the upper right direction in the figure. The liquid crystal molecule LM surrounded by the main pixel electrode PA, the sub-common electrode CBB1 and the second main common electrode CAL2 rotates clockwise with respect to the second direction Y along with the lateral electric field, and is substantially aligned so that the liquid crystal molecule LM may turn to the lower left direction in the figure. The liquid crystal molecule LM surrounded by the main pixel electrode PA, the sub-common electrode CBB1 and the second main common electrode CAR2 rotates counterclockwise with respect to the second direction Y along with the lateral electric field, and is substantially aligned so that the liquid crystal molecule LM may turn to the lower right direction in the figure.

Thus, in each pixel PX, in the state where the horizontal electric field is formed between the pixel electrode PE and the common electrode CE, the alignment direction of the liquid crystal molecule LM is divided into at least four groups of directions, and four domains are formed corresponding respective alignment directions. That is, at least four domains are formed in each pixel PX.

At the time of ON, the light which entered into the liquid crystal panel LPN from the backlight 4 enters into the liquid crystal layer LQ. When the back light which entered into the liquid crystal layer LQ passes through four domains (apertures) divided by the pixel electrode PE and the common electrode CE, respectively, the polarization state changes. At the time of ON, at least a portion of light which passed the liquid crystal layer LQ penetrates the second polarizing plate PL2 (white display).

Figure 7:
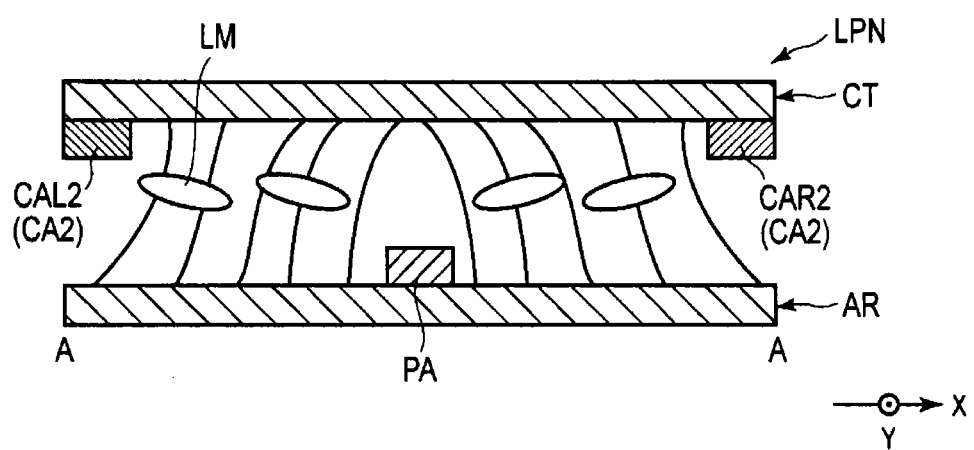

FIG. 7 is a view schematically showing a cross-sectional structure of the pixel taken along line A-A shown in FIG. 6 and an alignment state of the liquid crystal molecules at the time of ON.

In this embodiment, the alignment of the liquid crystal molecule LM is controlled by electric field mainly formed of the potential difference between the main pixel electrode PA and the second main common electrode CA2. On the both sides of the main pixel electrode PA, the liquid crystal molecule LM on the left-hand side domain is aligned by electric field between the main pixel electrode PA and the second main common electrode CAL2 so that the molecule LM may approximately turn on the left-hand side in the figure. The liquid crystal molecule LM in the right-hand side domain is aligned by electric field between the main pixel electrode PA and the second main common electrode CAR2 so that the molecule LM may approximately turn on the right-hand side in the figure.

Figure 8:
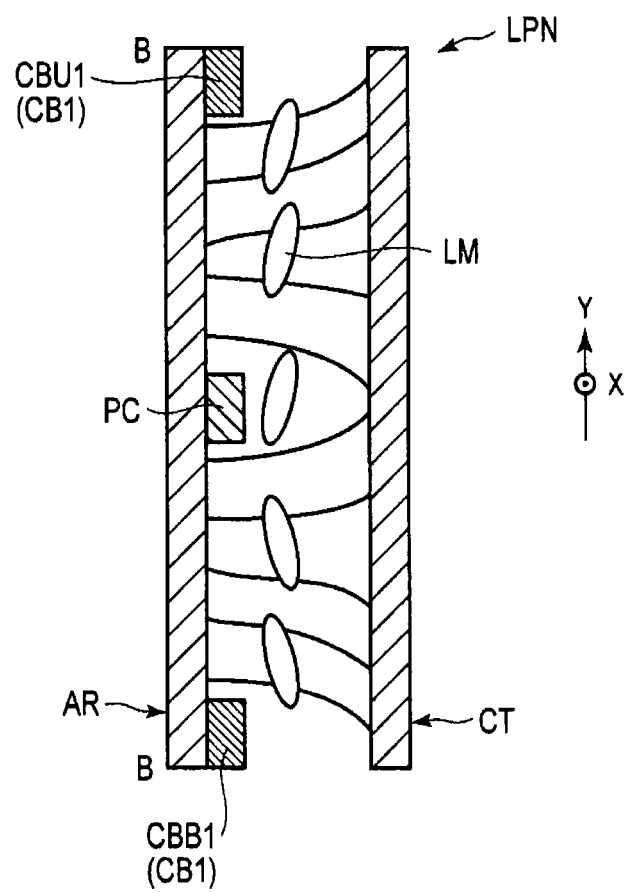

FIG. 8 is a view schematically showing a cross-sectional structure of the pixel taken along line B-B shown in FIG. 6 and an alignment state of the liquid crystal molecules at the time of ON.

In this embodiment, the liquid crystal molecule LM is aligned by the electric field mainly between the capacitance portion PC and the sub-common electrode CB1. However, the alignment of the liquid crystal molecule LM is controlled by a mutually affected electric field formed between the main pixel electrode PA and the sub-common electrode CB1 and between the capacitance portion PC and the second main common electrode CA2 other than between the main pixel electrode PA and the second main common electrode CA2. In the pixel divided into upper portion and lower portion by the capacitance portion C, the liquid crystal molecule LM in the upper portion is aligned so as to direct on the substantially upper side by the electric field between the capacitance portion PC and the sub-common electrode CBU1. The liquid crystal molecule LM in the lower side portion is aligned so as to direct on the substantially lower side in the figure by the electric field between the capacitance portion PC and the sub-common electrode CBB1.

According to this embodiment, it becomes possible to form at least four domains in one pixel. Therefore, the viewing angle in at least four directions can be compensated optically, and a wide viewing angle is attained. Accordingly, it becomes possible to offer a high quality display device.

Moreover, the transmissivity of each domain becomes equal by setting up the area of at least four apertures divided by the pixel electrode PE and the common electrode CE substantially equal in one pixel. Therefore, it becomes possible to achieve a uniform display with wide viewing angle by compensating the light passing the respective apertures each other.

Furthermore, since the sub-common electrode CB1 is arranged so that the sub-common electrode CB1 counters with the gate line, it becomes possible to shield undesired electric field from the gate line. For this reason, it becomes possible to suppress that undesirable bias is impressed from the gate line to the liquid crystal layer LQ, that display defect such as a printed picture is generated, and further that light leak is generated due to the disorder of the alignment of the liquid crystal molecule. Therefore, a high quality liquid crystal display device can be offered.

Since the regions between the main pixel electrode PA and the sub-common electrode CB1, and between the capacitance portion PC and the second main common electrode CA2 become apertures to contribute the display, the regions can contribute to the transmissivity.

The shield performance against the electric field from the gate line is improved with the increase of the width of the sub-common electrode CB1. However, since the aperture which contributes to the display is also formed between the sub-common electrode CB1 and the main pixel electrode PE, if the width of the sub-common electrode CB1 is too wide, the area of the aperture becomes small, and reduction of transmissivity is caused. Therefore, it becomes possible to raise the electric field shield performance against the electric field from the gate lines while maintaining high transmissivity in the case where the sub-common electrode CBU1 and the sub-common electrode CBB1 are respectively arranged on the gate line G1 and the gate line G2, and have substantially the same widths as the gate line G1 and the gate line G2.

In this embodiment, the second main common electrode CAL2 and the second common electrode CAR2 counter with the source line S1 and the source line S2, respectively. When the second main common electrode CAL2 and the second main common electrode CAR2 are especially arranged above the source line S1 and the source line S2, respectively, the aperture which contributes to the display can be expanded as compared with the case where the second main common electrode CAL2 and the second main common electrode CAR2 are arranged on the main pixel electrode PA side rather than on the source line S1 and the source line S2, and it becomes possible to improve the transmissivity of the pixel PX.

Moreover, it becomes possible to expand the distances between the main pixel electrode PA and the second main common electrode CAL2, and between the main pixel electrode PA and the second main common electrode CAR2 by arranging each of the second main common electrodes CAL2 and the second main common electrode CAR2 above the source line S1 and the source line S2, respectively, and also becomes possible to form more horizontal electric field closer to the horizontal direction. For this reason, it becomes possible to also maintain the wide viewing angle which is advantages of the general IPS mode.

Furthermore, at the time of ON, since horizontal electric field is hardly formed (or sufficient electric field to drive the liquid crystal molecule LM is not formed), the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, back light hardly penetrates, and hardly contributes to the display at the time of ON. Therefore, the pixel electrode PE and the common electrode CE do not necessarily need to be formed of a transparent electric conductive material, and may be formed using electric conductive materials, such as aluminum and silver.

Moreover, when an assembling shift occurs between the array substrate AR and the counter substrate CT, a difference may arises in distances between the respective common electrodes CE of the both sides and the pixel electrode PE. However, the alignment shift is produced in common to all the pixels PX, there is no difference in the electric field distribution between the pixels PX, and the influence to the display of the image is negligible.

Second Embodiment

Figure 9:
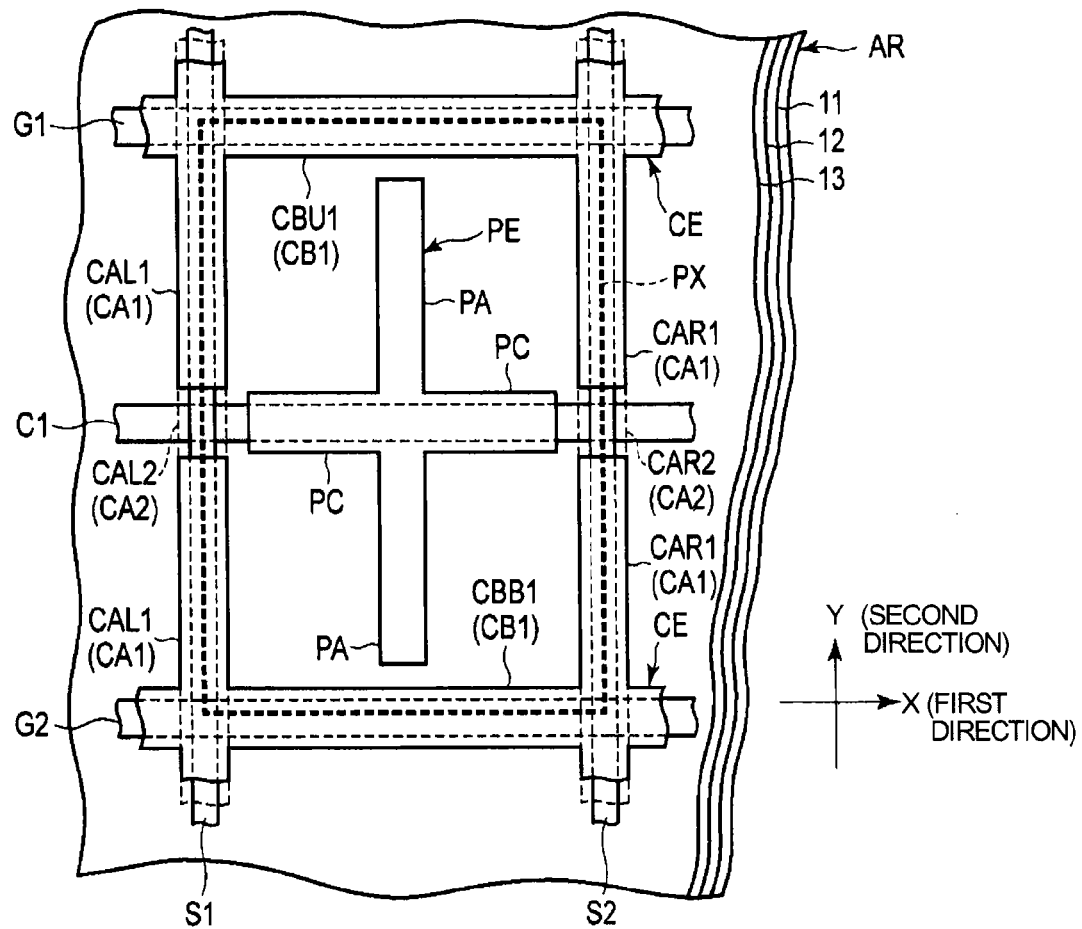
FIG. 9 is a plan view schematically showing the structure of the array substrate of the pixel according to a second embodiment when being seen from the counter substrate side.

FIG. 9 is a plan view schematically showing the structure of the array substrate of one pixel according to a second embodiment when being seen from the counter substrate CT side. In addition, only the structure of one pixel PX required for the explanation is illustrated, and the illustration of the switching element, etc., is omitted. Moreover, a dashed line shows the second main common electrode CA2 of the counter substrate which is not illustrated in the figure.

In this second embodiment, the counter substrate CT of the first embodiment shown in FIG. 4 is applicable. The common electrode CE includes a first main common electrode CA1 formed on the array substrate AR and the second main common electrode CA2 formed on the counter substrate CT as a main common electrode, and a sub-common electrode CB1 formed on the array substrate AR.

The array substrate AR includes the gate line G1 and the gate line G2, the auxiliary capacitance line C1, the source line S1 and the source line S2, and the pixel electrode PE like the first embodiment. Moreover, the array substrate AR includes the sub-common electrode CB1 linearly extending along the first direction X as the common electrode CE in a belt-like shape and the first main common electrode CA1 extending linearly along the second direction Y in the belt-like shape. The sub-common electrode CB1 and the first main common electrode CA1 are formed on the second interlayer insulating film 13, for example, like the pixel electrode.

In the common electrode CE, when the sub-common electrode CB1 and the first main common electrode CA1 are formed on the second interlayer insulating film 13 with the pixel electrode PE, the sub-common electrode CB1 and the first main common electrode CA1 can be formed by the same process using the same materials (for example, ITO, etc.) as the pixel electrode PE. In this case, the sub-common electrode CB1 and the first main common electrode CA1 are insulated electrically from the pixel electrode PE, and are apart from the pixel electrode PE, respectively. In addition, other interlayer insulating film may be interposed between the sub-common electrode CB1 and the first main common electrode CA1, and the pixel electrode layer PE. Thereby, the sub-common electrode CB1 and the first main common electrode CA1 may be formed in a different layer from the pixel electrode PE. In this case, the sub-common electrode CB1 and the first main common electrode CA1 are formed by different material from the pixel electrode PE or may be formed of the same material as the pixel electrode PE.

The sub-common electrode CB1 (the illustrated sub-common electrode CBU1 and the sub-common electrode CBB1) linearly extends facing the gate line in the active area like the first embodiment, respectively. Moreover, the sub-common electrode CB1 is pulled out to the outside of the active area, and electrically connected with the electric supply portion formed in the array substrate AR, and electric power of common potential is supplied to the sub-common electrode CB1. That is, the sub-common electrode CB1 and the second main common electrode CA2 are electrically connected.

Moreover, the first main common electrode CA1 extends linearly, facing the source lines in the active area, respectively. However, the first main common electrode CA1 is cut off on the auxiliary capacitance line C1. The first main common electrode CA1 is electrically connected with the sub-common electrode CB1. In the illustrated example, the first main common electrode CA1 and the sub-common electrode CB1 are formed integrally and continuously. Moreover, in the illustrated example, the first main common electrode CA1 is located in two lines in parallel each other along the first direction X. Hereinafter, in order to distinguish the first main common electrodes CA1, the first main common electrode CA1 on the left-hand side in the figure is called CAL1, and the first main common electrode on the right-hand side in the figure is called CAR1.

The first main common electrode CAL1 is arranged at the left-hand side end of the pixel PX, and faces the source line S1. That is, the first main common electrode CAL1 is arranged striding over a boundary between the illustrated pixel and a pixel adjoining the illustrated pixel PX on its left-hand side. However, the first main common electrode CAL1 is not arranged on an intersection portion with the source line S1 which intersects the auxiliary capacitance line C1.

The first main common electrode CAR1 is arranged at the right-hand side end of the pixel PX, and faces the source line S2. That is, the first main common electrode CAR1 is arranged striding over a boundary between the illustrated pixel and an adjoining pixel PX on its right-hand side. However, the first main common electrode CAR1 is not arranged on an intersection portion with the source line S2 which intersects the auxiliary capacitance line C1.

The second interlayer insulating film 13 is interposed, respectively between the first main common electrode CAL1 and the source line S1 and between the first main common electrode CAR1 and the source line S2.

In case the first main common electrode CAL1 and the first main common electrode CAR1 cover the source line S1 and the source line S2 in the active area, respectively, that is, the first main common electrode CAL1 is arranged on the source line S1, and similarly when the first main common electrode CAR1 is arranged on the source line S2, the respective widths of the first main common electrodes CAL1 and CAR1 in the first direction X are equal to or larger than those of the source line S1 and the source line S2 in the first direction X.

In the illustrated example, the second main common electrode CAL2 formed on the counter substrate CT and constituting the common electrode CE is arranged at the left-hand side end of the pixel PX, and faces the first main common electrode CAL1. Similarly, the second main common electrode CAR2 formed on the counter substrate CT and constituting the common electrode CE is arranged at the right-hand side end of the pixel PX, and faces the first main common electrode CAR1. Off course, the second main common electrode CAL2 and the second main common electrode CAR2 extend in the second direction without being cut above the auxiliary capacitance line C1.

According to the second embodiment, the same effect as the first embodiment is achieved. It is possible to suppress the application of undesirable bias from the source line to the liquid crystal layer LQ by shielding undesirable electric field from the source line because the first main common electrode CA1 of the common electrode CE is arranged so as to face the source line. Thereby the generation of a defect display such as a cross talk is controlled. Namely, in the state where a pixel PX is set to a potential to display the black image, the phenomenon of rising up of luminosity resulted from light leak of the pixel is suppressed when the pixel potential which displays white is supplied to the source line connected to the pixel PX. Thereby, it becomes possible to control the generating of a poor display. Accordingly, a higher quality liquid crystal display device can be offered.

The shield performance against electric field from the source line is improved with the increase of the width of the first main common electrode CA1. However, since the aperture which mainly contributes to the display is formed between the first main common electrode CA1 and the main pixel electrode PA, if the width of the first main common electrode CA1 is too wide, the area of the aperture becomes small and reduction of transmissivity is caused. Therefore, it becomes possible to raise the electric field shield performance against the electric field from the source lines while maintaining high transmissivity in the case where the first main common electrode CAL1 and the first main common electrode CAR1 are respectively arranged on the source line S1 and the source line S2, and have substantially the same widths as those of the source line S1 and the source line S2.

Moreover, in this second embodiment, it becomes possible to control a short-circuit of the pixel electrode PE with the common electrode CE, even if the first main common electrode CA1 is formed on the same layer as the pixel electrode PE, because the capacitance portion PC facing the auxiliary capacitance line C1 is apart from the first main common electrode CA1 cut off on the auxiliary capacitance line C1.

In addition, the auxiliary capacitance line is arranged in the central portion of the pixel in the first and second embodiments. The embodiments are especially suitable for a capacitance coupling dot inversion driving (CCDI driving) in which a capacitance coupling driving is performed using a dot inversion driving. That is, the pixel voltage is reached to a predetermined voltage by superimposing an auxiliary capacitance signal on the pixel electrode PE through a retention capacitance Cs of each pixel in the capacitance coupling driving (CC driving). Thereby, signal voltage amplitude can be approximately reduced by half if the retention capacitance Cs and the pixel capacitance are set to be equal. In the CCDI driving, the retention capacitance Cs of the adjacent pixels PX is coupled to mutually different auxiliary capacitance lines C, respectively, and the auxiliary capacitance voltages supplied to the retention capacitance Cs of the adjacent pixels PX are made mutually different polarities. The driver IC chip 2 including the gate driver GD, the source driver SD, and the controller functions as driving means for performing the CCDI driving, and is equipped in the array substrate AR.

According to the structure using the CCDI driving, while being able to reduce power consumption, it becomes possible to control the degradation of display grace.

Third Embodiment

Figure 10:
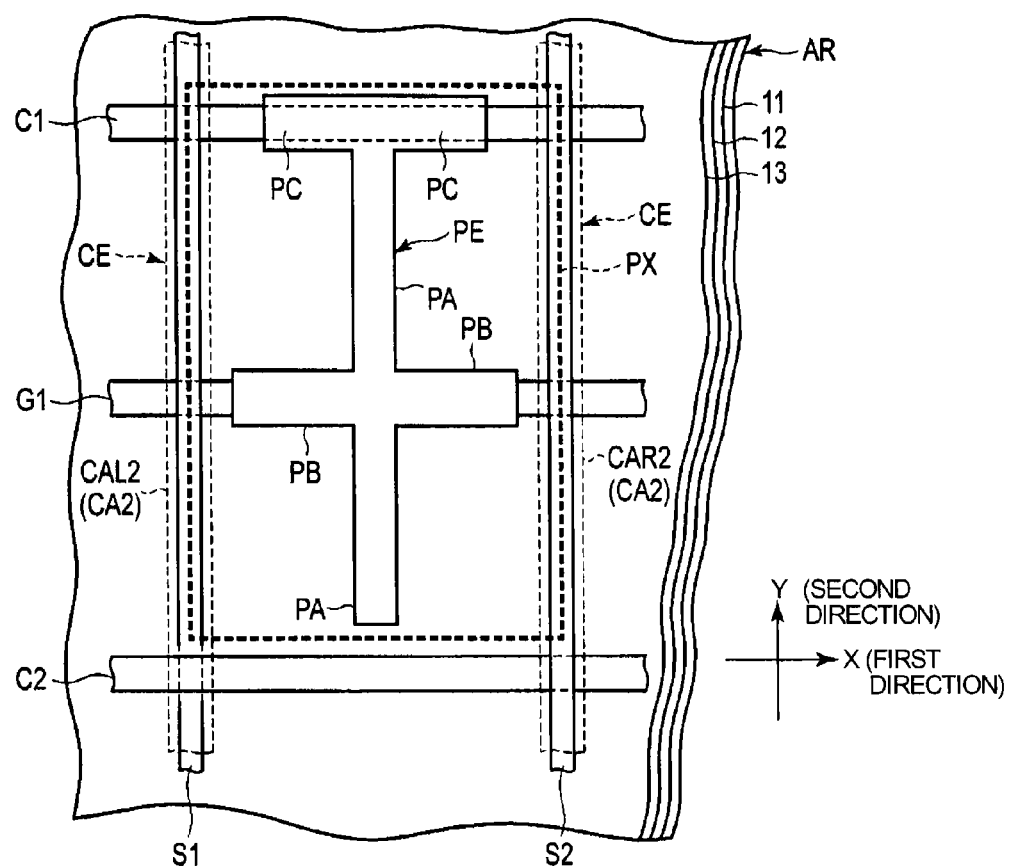
FIG. 10 is a plan view schematically showing the structure of the array substrate of the pixel according to a third embodiment when being seen from the counter substrate side.

FIG. 10 is a plan view schematically showing the structure of the array substrate of one pixel according to a third embodiment when being seen from a counter substrate CT side. In addition, only the structure of one pixel PX required for the explanation is illustrated, and the illustration of the switching element, etc., is omitted. Moreover, a dashed line shows the second main common electrode CA2 of the counter substrate which is not illustrated in the figure.

In this third embodiment, the counter substrate CT of the first embodiment shown in FIG. 4 is applicable. The common electrode CE includes the second main common electrode CA2 formed on the counter substrate CT as the main common electrode.

The array substrate AR includes an auxiliary capacitance line C1 and an auxiliary capacitance line C2 extending in the first direction X, a gate line G1 arranged between the auxiliary capacitance line C1 and the auxiliary capacitance line C2 and extending in the first direction X, a source line S1 and a source line S2 extending in the second direction Y, and a pixel electrode PE extending in the first direction X.

In the illustrated example, the source line S1 is arranged at the left-hand side end in the pixel PX. Precisely, the source line S1 is arranged striding over a boundary between the illustrated pixel and a pixel adjoining the illustrated pixel PX on its left-hand side. The source line S2 is arranged at the right-hand side end in the pixel PX. Precisely, the source line S2 is arranged striding over a boundary between the illustrated pixel and a pixel adjoining the illustrated pixel PX on its right-hand side. Moreover, in the pixel PX, the auxiliary capacitance line C1 is arranged at the upper end portion, and the gate line G1 is arranged approximately in the central portion of the pixel PX.

The pixel electrode PE is arranged between the source line S1 and the source line S2. The pixel electrode PE is electrically connected with the switching element which is not shown. The pixel electrode PE has the main pixel electrode PA in the shape of a belt extending linearly along the second direction Y, the sub-pixel electrode PB in the shape of a belt extending linearly along the first direction X, and the capacitance portion PC in the shape of a belt extending linearly along the first direction X. The main pixel electrodes PA, the sub-pixel electrode PB, and the capacitance portion PC are electrically connected each other. In the illustrated example, the main pixel electrode PA, the sub-pixel electrode PB, and the capacitance portion PC are integrally or continuously formed. That is, the main pixel electrode PA, the sub-pixel electrode PB, and the capacitance portion PC are formed on the second interlayer insulating film 13 using the same process and the same material.

The main pixel electrode PA is arranged in an inside position of the pixel PX rather than the position on the adjoining source line S1 and the source line S2, and is arranged between the source line S1 and the source line S2. More specifically, the main pixel electrode PA is arranged in the approximately center position between the source line S1 and the source line S2. The main pixel electrode PA extends from vicinity of the upper end to vicinity of a bottom end of the pixel PX.

The sub-pixel electrode PB faces the gate line G1. The first interlayer insulating film 12 and the second interlayer insulating film 13 are interposed between the sub-pixel electrode PB and the gate line G1 as insulating films. That is, the sub-pixel electrode PB is located inside the pixel PX rather than the position on the adjoining auxiliary capacitance line C1 and the auxiliary capacitance line C2, and is arranged between the auxiliary capacitance line C1 and the auxiliary capacitance line C2. The sub-pixel electrode PB is arranged approximately in the central portion of the pixel, and more specifically, is arranged approximately in the central portion between the auxiliary capacitance line C1 and the auxiliary capacitance line C2. The sub-pixel electrode PB intersects the main pixel electrode PA, and linearly extends toward the source line S1 and the source line S2 on the both sides, i.e., on the left-hand side of the main pixel electrode PA, and on the right-hand side of the main pixel electrode PA, respectively from the main pixel electrode PA.

In case the sub-pixel electrode PB covers the gate line G1 in each pixel PX, that is, the sub-pixel electrode PB is arranged on the gate line G1, the width of the sub-pixel electrode PB is substantially equal to or larger than that of the gate line G1 in the second direction Y.

The capacitance portion PC is arranged on the auxiliary capacitance line C1. The first interlayer insulating film 12 and the second interlayer insulating film 13 are interposed between the capacitance portion PC and the auxiliary capacitance line C1 as insulating films. More specifically, the capacitance portion PC is arranged at the upper end portion of the pixel PX. The capacitance portion PC is connected with one end of the main pixel electrode PA, and linearly extends toward the source line S1 and the source line S2 of the both sides, i.e., the left-hand side of the main pixel electrode PA, and on the right-hand side of the main pixel electrode PA, respectively from the main pixel electrode PA.

In this embodiment, the second main common electrode CA2 is arranged at the both sides which sandwich the main pixel electrode PA. That is, the main pixel electrode PA and the second main common electrode CA2 are arranged by turns along the first direction X. The main pixel electrode PA and the second main common electrode CA2 are arranged approximately in parallel. At this time, neither of the second main common electrodes CA2 overlaps with the main pixel electrode PA in the X-Y plane.

That is, one main pixel electrode PA is located between adjoining the second main common electrode CAL2 and the second main common electrode CAR2. That is, the second main common electrode CAL2 and the second main common electrode CAR2 are arranged on the both sides which sandwich a position above the main pixel electrode PA. For this reason, the second main common electrode CAL2, the main pixel electrode PA, and the second main common electrode CAR2 are arranged along the first direction X in this order. The distance between the second main common electrode CAL2 and the main pixel electrode PA in the first direction X is substantially equal to that between the second main common electrode CAR2 and the main pixel electrode PA.

According to the third embodiment, the same effect as the first embodiment is achieved. It is possible to suppress the application of undesirable bias from the gate line to the liquid crystal layer LQ by shielding undesirable electric field from the gate line because the sub-pixel electrode PB of the pixel electrode PE is arranged facing the gate line. Accordingly, it becomes possible to suppress the application of the undesired bias from the gate line to the liquid crystal layer LQ. A defect display such as a printed picture and a light leak due to an alignment disorder of the liquid crystal molecule is suppressed. Accordingly, a higher quality liquid crystal display device can be offered.

The shield performance against the electric field from the gate line is improved with the increase of the width of the sub-common electrode PB. However, if the width of the sub-pixel electrode PB is too wide, the area of the aperture becomes small and reduction of transmissivity is caused. Therefore, it becomes possible to raise the electric field shield performance against the electric field from the gate lines G1 while maintaining high transmissivity in the case where the sub-pixel electrode PB is arranged on the gate line G1 and has substantially the same width as the gate line G1.

Moreover, no common electrode which needs an electric insulation from the pixel electrode is arranged in the array substrate AR. For this reason, it becomes possible to improve the flexibility of the layout of the pixel electrode PE according to the various purposes, such as formation of the retention capacitance, and shielding of the electric field from the gate line.

In addition, the auxiliary capacitance lines are arranged at the upper end portion and the lower end portion, and the gate is arranged in the central portion of the pixel PX in the third embodiment. This embodiment is especially suitable for a capacitance coupling driving (CC driving). That is, the pixel voltage is reached to a predetermined voltage by superimposing an auxiliary capacitance signal on the pixel electrode PE through a retention capacitance Cs of each pixel. Thereby, signal voltage amplitude can be approximately reduced by half if the retention capacitance Cs and the pixel capacitance are set to be equal. The driver IC chip 2 equipped with the gate driver GD, the source driver SD, and the controller functions as driving means for performing the CC driving, and is equipped in the array substrate AR.

According to the embodiment using the CC driving, while being able to reduce power consumption, it becomes possible to control degradation of display grace.

Next, the effect according to this embodiment is verified.

The liquid crystal display panels LPN respectively corresponding to the first embodiment shown in FIG. 4 to FIG. 8, and the third embodiment shown in FIG. 10 were prepared, and the transmissivity per one pixel was measured. In addition, in the first embodiment and the third embodiment, the electrode width, the distance between the electrodes, the pixel pitch, the cell gap, the liquid crystal material, the alignment film material, the alignment direction, etc., were altogether made into the same conditions except that the forms of the pixel electrode PE and the common electrode CE differ each other. When the transmissivity of the liquid crystal display panel corresponding to the third embodiment was set to 1.0, the transmissivity of the liquid crystal display panel according to the first embodiment was 1.1.

As explained-above, according to the embodiments, it becomes possible to offer the high quality liquid crystal display device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device having a plurality of pixels, comprising:
   a first substrate including;
      a first gate line and a second gate line respectively extending in a first direction,
      an auxiliary capacitance line arranged between the first gate line and the second gate line and extending in the first direction,
      a first insulating layer covering the first gate line, the second gate line, and the auxiliary capacitance line,
      a first source line and a second source line extending in a second direction orthogonally crossing the first direction on the first insulating layer,
      a second insulating layer covering the first and second source lines,
      a main pixel electrode arranged on the second insulating layer and extending in the second direction, the main pixel electrode being arranged between the first gate line and the second gate line, and between the first source line and the second source line,
      a pair of sub-common electrodes respectively facing the first gate line and the second gate line through the second insulating layer and extending in the first direction, and
      a pair of main common electrodes respectively facing the first and second source lines through the second insulating layer and extending in the second direction,
   the pair of main common electrodes being respectively cut on the auxiliary capacitance line and electrically connected with the sub-common electrodes,
   a second substrate facing the first substrate; and
   a liquid crystal layer containing liquid crystal molecules and held between the first substrate and the second substrate.

2. The liquid crystal display device according to claim 1, wherein the first substrate further includes a capacitance portion facing the auxiliary capacitance line through the second insulating layer and extending in the first direction, the capacitance portion being apart from the pair of main common electrodes and electrically connected with the main pixel electrode.

3. The liquid crystal display device according to claim 2, wherein the capacitance portion is located approximately in the center portion of the pixel.

4. The liquid crystal display device according to claim 1, wherein
   the respective sub-common electrodes are arranged on the first gate line and the second gate line and have substantially the same widths as those of the first and second gate lines, and
   the pair of main common electrodes is arranged on the first and second source lines and has substantially the same width as those of the first and second source lines.

5. The liquid crystal display device according to claim 1, wherein the main pixel electrode is formed of the same materials as those of the sub-common electrodes and the pair of main common electrodes.

6. The liquid crystal display device according to claim 1, wherein an initial alignment direction of the liquid crystal molecules is a direction substantially in parallel with the second direction.

7. The liquid crystal display device according to claim 1, wherein the liquid crystal display device is driven by a capacitance coupled dot inversion driving (CCDI).

8. A liquid crystal display device having a plurality of pixels, comprising:
   a first substrate including;
      a first auxiliary capacitance line and a second auxiliary capacitance line respectively extending in a first direction,
      a gate line arranged between the first auxiliary capacitance line and the second auxiliary capacitance line respectively extending in the first direction, and approximately in the center portion of the pixel,
      a main pixel electrode extending in a second direction orthogonally crossing the first direction,
      a sub-pixel electrode facing the gate line through an insulating layer and extending in the first direction, the sub-pixel electrode being electrically connected with the main pixel electrode,
   a second substrate facing the first substrate; and
   a liquid crystal layer containing liquid crystal molecules and held between the first substrate and the second substrate.

9. The liquid crystal display device according to claim 8, wherein
   the sub-pixel electrode is arranged on the gate line and has a substantially the same width as that of the gate line.

10. The liquid crystal display device according to claim 8, wherein
    the main pixel electrode is formed on the insulating layer using the same material as that of the sub-pixel electrode.

11. The liquid crystal display device according to claim 8, wherein
    an initial alignment direction of the liquid crystal molecules is a direction substantially in parallel with the second direction.

12. The liquid crystal display device according to claim 8, wherein the main pixel electrode includes a capacitance portion arranged facing one of the auxiliary capacitance lines to form a retention capacitance.

13. The liquid crystal display device according to claim 8, wherein the liquid crystal display device is driven by a capacitance coupling driving (CC driving).

\* \* \* \* \*